United States Patent
Noda

(10) Patent No.: US 6,549,321 B2
(45) Date of Patent: Apr. 15, 2003

(54) OPTICAL MODULATOR

(75) Inventor: Masaki Noda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/764,442

(22) Filed: Jan. 19, 2001

(65) Prior Publication Data

US 2002/0018280 A1 Feb. 14, 2002

(30) Foreign Application Priority Data

Aug. 8, 2000 (JP) .................................. 2000-239880

(51) Int. Cl.⁷ .............................................. H04B 10/02
(52) U.S. Cl. ........................................ 359/248; 359/245
(58) Field of Search ............................ 359/248, 245, 359/237

(56) References Cited

U.S. PATENT DOCUMENTS 5,546,218 A * 8/1996 Komatsubara et al. ...... 359/237
6,002,510 A   12/1999 Ishizaka

FOREIGN PATENT DOCUMENTS

JP          10-13351         1/1998
JP          10-293278        11/1998

* cited by examiner

Primary Examiner—Georgia Epps
Assistant Examiner—Richard Hanig
(74) Attorney, Agent, or Firm—Leydig, Voit & Mayer, Ltd.

(57) ABSTRACT

According to the voltage-current characteristic of a diode mounted on a high-frequency circuit substrate, a waveform of an applied electric signal is shaped into a desired waveform and applied to an electroabsorbing light modulating semiconductor element. The waveform of the modulated output light output from the optical modulator is highly improved although the extinction characteristic of the light modulating semiconductor element is not linear.

8 Claims, 16 Drawing Sheets with diode 4a with diode 4b with diode 4c, 4d

OPTICAL MODULATOR

BACKGROUND OF THE INVENTION

The present invention relates to an optical modulator for use in an optical communication system.

FIG. 15 is a conceptual diagram of a conventional optical modulator. As shown, the conventional optical modulator comprises an light modulating semiconductor element 1 of an electric field absorption type (hereinafter "an electroabsorption type light modulating semiconductor element"), a high-frequency circuit substrate 2 for feeding an RF signal to the electroabsorption type light modulating semiconductor element 1, a terminating resistor substrate 3, an input optical coupling system 7a and an output optical coupling system 7b. The terminating resistor substrate 3 includes a terminating resistor 3a for impedance matching, a through hole 3b, and a transmission line connecting them. The high-frequency circuit substrate 2, the electroabsorption type light modulating semiconductor element 1, and the terminating resistor substrate 3 are electrically connected by wires 6 or the like.

In the conventional optical modulator, the terminating resistor substrate 3 has a back side thereof serving as a grounding electrode which is electrically connected via the through hole 3b to the terminating resistor 3a. Also, the back side of the light modulating semiconductor element 1 is a grounding electrode. Hence, the light modulating semiconductor element 1 and the terminating resistor 3a are electrically connected in parallel with each other. Thus, the internal impedance of the optical modulator is a normalized impedance. The high-frequency circuit substrate 2 has a transmission line 5 for transmitting the RF signal.

The operation of the conventional modulator is now explained. For example, as the light modulating semiconductor element 1 is of an electric field absorption type, it can efficiently receive a continuously oscillated laser light from the input optical coupling system 7a. The light modulating semiconductor element 1 absorbs the laser light, and the amount of absorption is proportionate to the voltage of applied electric signal through the high-frequency circuit substrate 2. Accordingly, when high-frequency circuit substrate 2 is fed with a voltage signal for modulation, intensity of the laser light released from the emitting end of the light modulating semiconductor element 1 is modulated correspondingly to the voltage of the signal. The light released from the light modulating semiconductor element 1 is efficiently provided to the output optical coupling system 7b.

Some prior art modulators are disclosed in Japanese Unexamined Patent Publication No. Hei. 10-293278, Japanese Unexamined Patent Publication No. Hei. 10-01335 and U.S. Pat. No. 6,002,510.

However, in such an electroabsorption type light modulating semiconductor element of an electric field absorption type, its extinction characteristic, which means relationship between optical output and applied voltage, is not linear as shown in FIG. 16. More specifically, optical output of the electroabsorption type light modulating device is highly responsive to a change of the applied voltage in a lower range, while not responsive in a higher range of the applied voltage.

Accordingly, a ringing or pattern effect in the waveform of the applied voltage is emphasized and appears in the waveform of the optical output, especially at the mark side. Thus the waveform of an optical output is degraded and its eye aperture in a so-called "eye pattern" test which evaluates the quality of waveform of optical output declines.

SUMMARY OF THE INVENTION

The present invention has been developed in view of the above drawbacks and its object is to provide an optical modulator which can produce an optical output of improved waveform while its light modulating element has a non-linear extinction characteristic.

In order to achieve the object described above, an optical modulator according to the present invention comprises an electroabsorption type light modulating semiconductor element having a non-linear extinction characteristic, a high-frequency electric circuit for supplying the light modulating semiconductor element with a high-frequency electric signal, and a terminating resistor for impedance matching, wherein the high-frequency electric circuit includes a transmission line for transmitting the high-frequency electric signal and a diode connected to the transmission line.

The diode may be connected in series to the transmission line.

The diode may also be connected in parallel with the transmission line.

A pair of diodes may be connected in parallel with the transmission line with their electrical polarities oriented opposite to each other.

Preferably, the light modulating semiconductor element and the high-frequency electric circuit may be located adjacent to each other.

The high-frequency electric circuit and the terminating resistor may be mounted integrally on a single circuit board on which the light modulating semiconductor element is also mounted in a flip-chip bonding.

A semiconductor laser emitting device may be formed and monolithically integrated with the light modulating semiconductor element.

The above and other objects, features and advantages of the present invention will become apparent from the following description with reference to the accompanying drawings which illustrate embodiments of the present invention.

DETAILED DESCRIPTION

Embodiment 1

Figure 1:
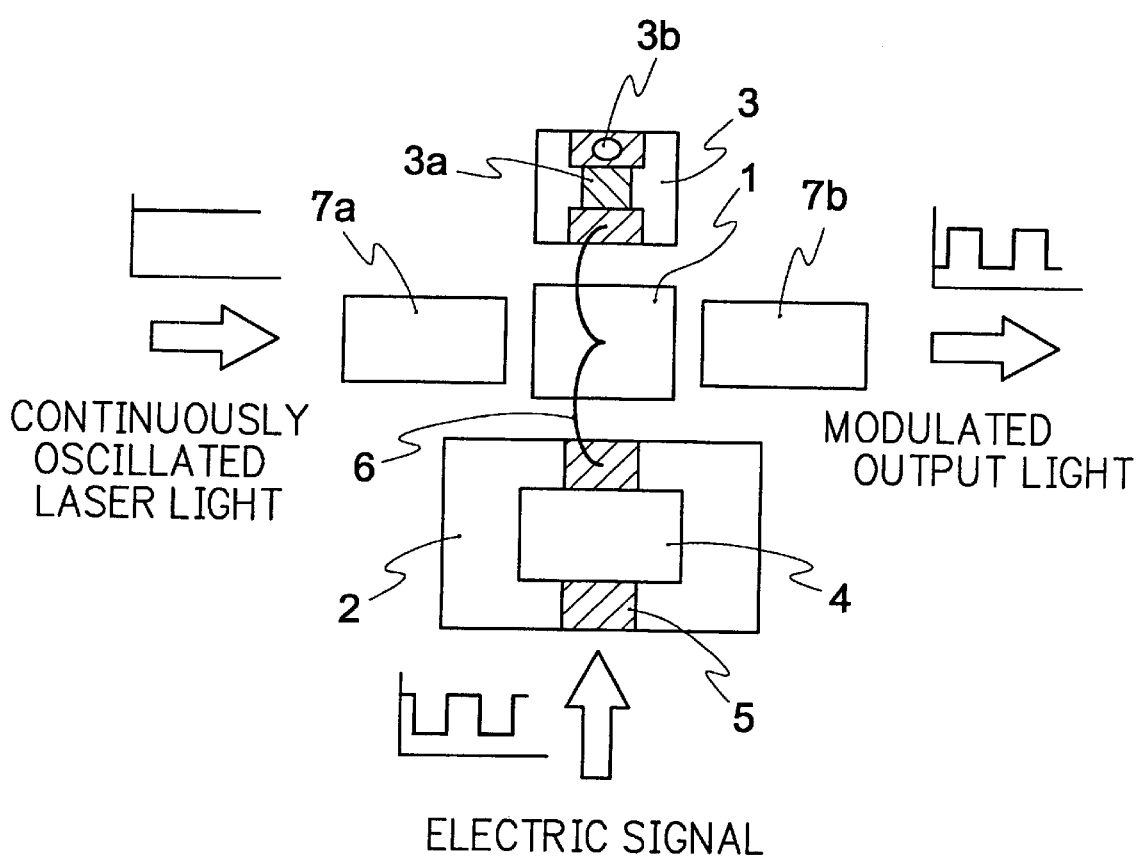
FIG. 1 is a conceptual diagram of an optical modulator according to the first embodiment of the present invention.
Figure 2:
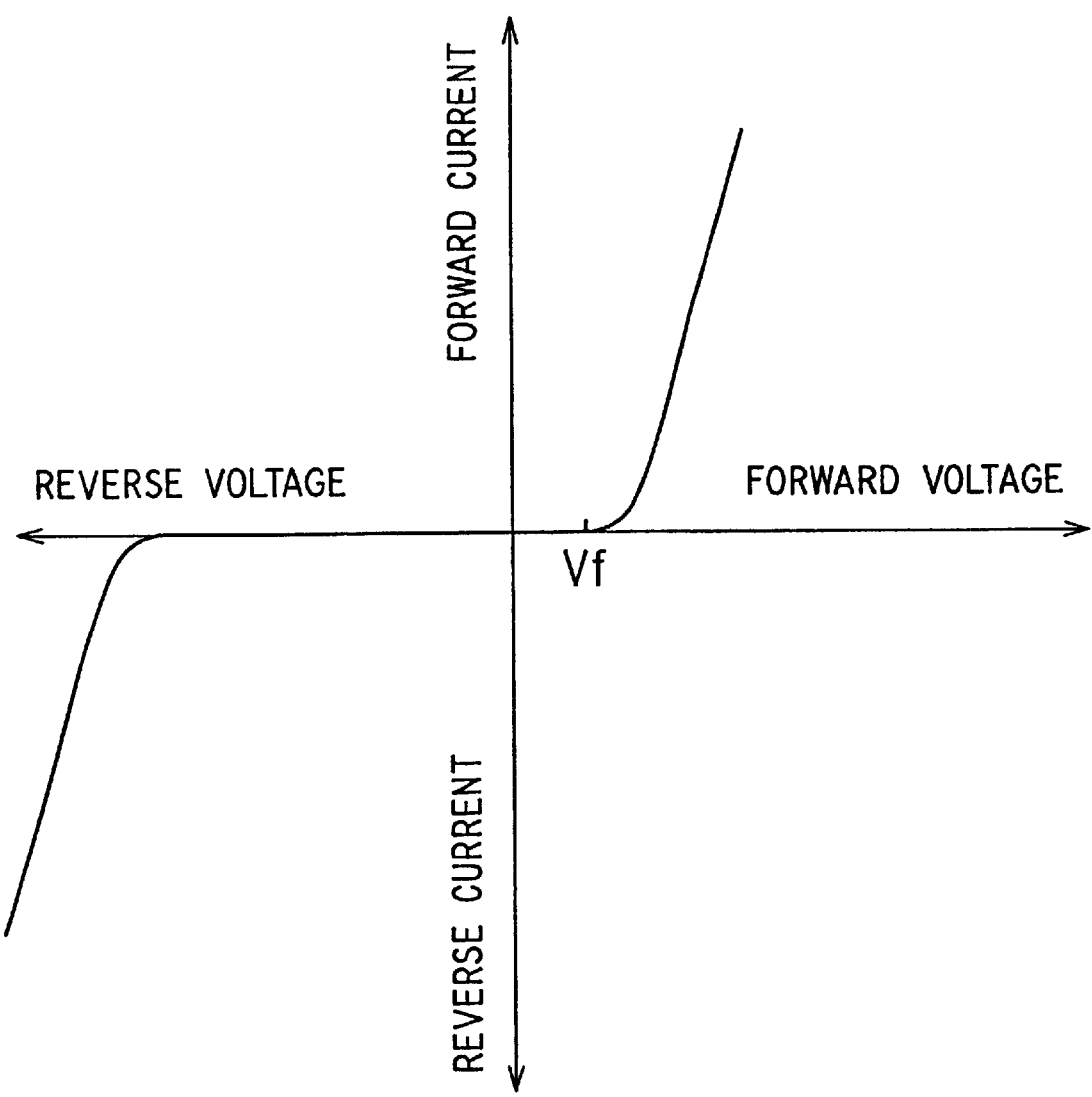
FIG. 2 is a graph showing a voltage-current characteristic of a diode.

FIG. 1 is a conceptual diagram of an optical modulator showing Embodiment 1 of the present invention. FIG. 2 shows a voltage-current characteristic of a diode. The optical modulator comprises an light modulating semiconductor element 1 of an electric field absorption type (hereinafter "an electroabsorption type light modulating semiconductor element") using the quantum confined Stark effect or the Franz-Keldysh effect, a high-frequency circuit substrate 2 for feeding an RF signal to the electroabsorption type light modulating semiconductor element 1, a terminating resistor substrate 3, an input optical coupling system 7a, and an output optical coupling system 7b. The terminating resistor substrate 3 is equipped with a terminating resistor 3a for impedance matching, a through hole 3b, and a transmission line for connecting them. The high-frequency circuit substrate 2, the light modulating semiconductor element 1, and the terminating resistor substrate 3 are connected by wires 6 or the like. The high-frequency circuit substrate 2 has a transmission line 5 mounted thereon for transmission of the RF signal and a diode 4 also mounted thereon to connect electrically to the transmission line 5.

The terminating resistor substrate 3 has a back side thereof serving as a grounding electrode which is electrically connected via the through hole 3b to the terminating resistor 3a. Also, the back side of the light modulating semiconductor element 1 is a grounding electrode. Hence, the light modulating semiconductor element 1 and the terminating resistor 3a are electrically connected in parallel with each other so as to make the internal impedance of the optical modulator a normalized impedance.

The operation of the modulator is now explained. As shown in FIG. 1, a continuously oscillated laser light is provided to the electroabsorption type light modulating semiconductor element 1 through the input optical coupling system 7a efficiently. Since the electroabsorption type light modulating semiconductor element 1 absorbs the laser light in response to the voltage of the RF signal applied through the high-frequency circuit substrate 2, the intensity of the laser light released from the emitting end of the light modulating semiconductor element 1 is modulated corresponding to the applied signal. The light released from the light modulating semiconductor element 1 is efficiently provided to the output optical coupling system 7b.

The optical modulator of the present invention has the diode 4 mounted on the high-frequency circuit substrate 2 for shaping the waveform of an input electric signal, thus the electric signal of well defined waveform is provided for the light modulating semiconductor element 1.

Now, the function of the diode 4 for shaping the waveform of the input electric signal is explained. The voltage-current characteristic of a diode is not linear, as shown in FIG. 2. When the diode is loaded at both ends with a reverse voltage or a forward voltage smaller than Vf (a rise voltage in the forward direction), it draws no current. When the voltage is larger than Vf, the diode draws a current.

The voltage-current characteristic can hence suppress a change in the voltage (ringing or pattern effect) at the mark side and space side of an electric signal waveform to be applied to the light modulating semiconductor element. Accordingly, the optical modulator can produce and release a desired waveform of modulated output light while the extinction characteristic of its electroabsorption type light modulating semiconductor element is not linear. As the eye mask standard or the eye aperture is used for expressing the quality of the waveform of modulated laser light, its requirement can successfully be satisfied by the optical modulator of this embodiment.

If the diode 4 is carelessly located, there may be developed an electrical multiple reflection between the diode 4 and the light modulating semiconductor element 1 which possibly declines the waveform or the frequency response of a modulated output light of the optical modulator.

A primary mode of such multiple reflection appears when the electrical length between diode 4 and the light modulating semiconductor element 1 equals to a half the wavelength of the electric signal. Accordingly, the electrical length becomes shorter, the frequency of the primary mode will become higher enough to be out of (higher than) a frequency range of the electric signal applied to the light modulating device 1. If the distance between the diode 4 and the light modulating semiconductor element 1 is longer and there is a point causing impedance mismatching, e.g. a connecting point of the wire 6, between them, the electric signal of which the waveform is shaped by the diode 4 may be degraded before reaching the light modulating semiconductor element 1.

As the diode 4 is located on the high-frequency circuit substrate 2 adjacent to the light modulating semiconductor element 1, the modulated output light released from the optical modulator can have an improved of waveform.

Embodiment 2

Figure 3:
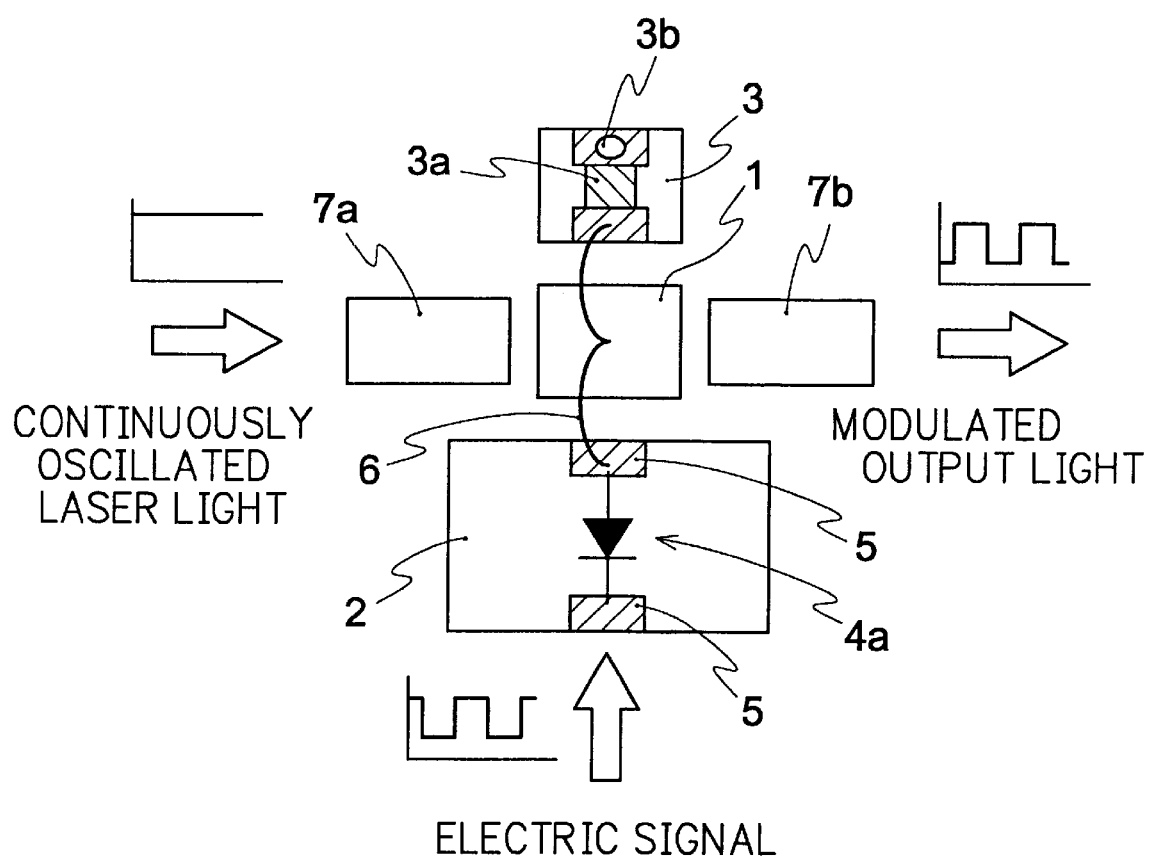
FIG. 3 is a conceptual diagram of an optical modulator according to the second embodiment of the present invention.
Figure 4:
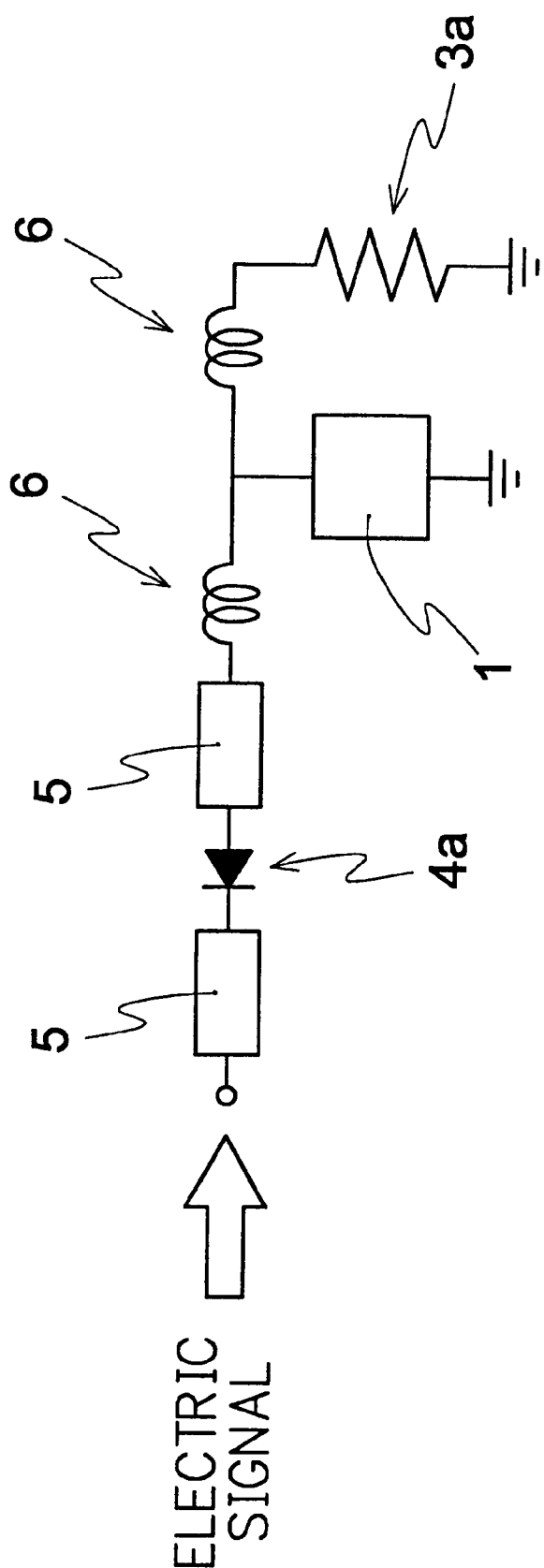
FIG. 4 is a schematic circuit diagram of the optical modulator according to the second embodiment of the present invention.

FIG. 3 is a conceptual diagram of an optical modulator showing Embodiment 2 of the present invention. FIG. 4 is a schematic circuit diagram of the optical modulator of this embodiment. In FIGS. 3 and 4, like components are denoted by identical numerals as those shown in FIG. 1. A high-frequency circuit substrate 2 of the optical modulator of this embodiment has a diode 4a mounted thereon as connected in series to a transmission line 5 in a reverse direction.

Figure 5B:
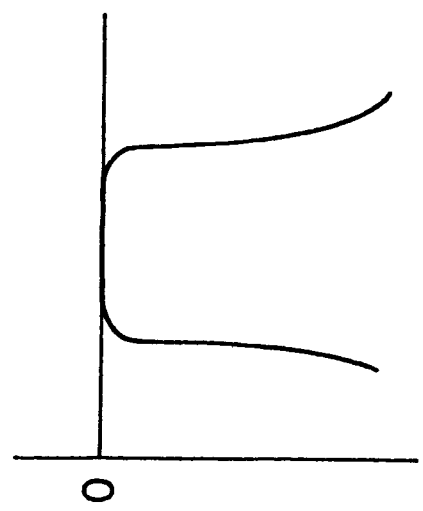
FIG. 5(b) illustrates a waveform of the electric signal applied to the light modulating semiconductor element in the second embodiment of present invention.
Figure 5A:
FIG. 5(a) illustrates a waveform of an applied electric signal.
Figure 5A:
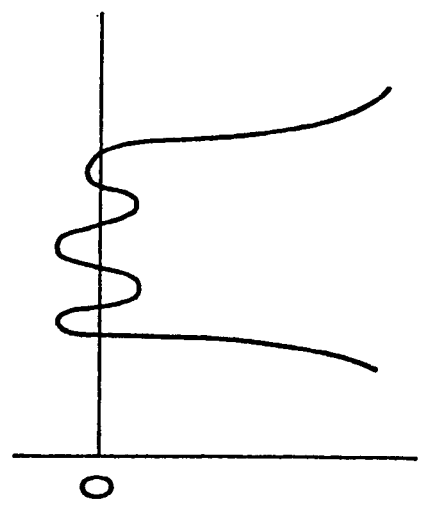

The voltage-current characteristic of the diode 4a teaches that when the diode 4a is loaded at both ends with a reverse voltage or a forward voltage smaller than Vf, the diode 4a draws no current. Accordingly, the voltage applied to the light modulating semiconductor element 1 is set to about 0 V at the mark side, thus a change in the voltage (ringing or pattern effect) at the mark side of the electric signal waveform applied to the light modulating semiconductor element 1 can favorably be suppressed as shown in FIG. 5. FIG. 5(a) illustrates the waveform of an electric signal introduced to the high-frequency circuit substrate 2 while FIG. 5(b) shows the waveform of the electric signal which has desirably been shaped by the diode 4a and is applied to the light modulating semiconductor element 1.

This allows the optical modulator to produce an improved waveform of modulated output light while the extinction characteristic of its electroabsorption type light modulating semiconductor element 1 is not linear. As a result, the eye mask standard or the eye aperture used for expressing the quality of the waveform of modulated output light can successfully be satisfied by the optical modulator of this embodiment.

Embodiment 3

Figure 6:
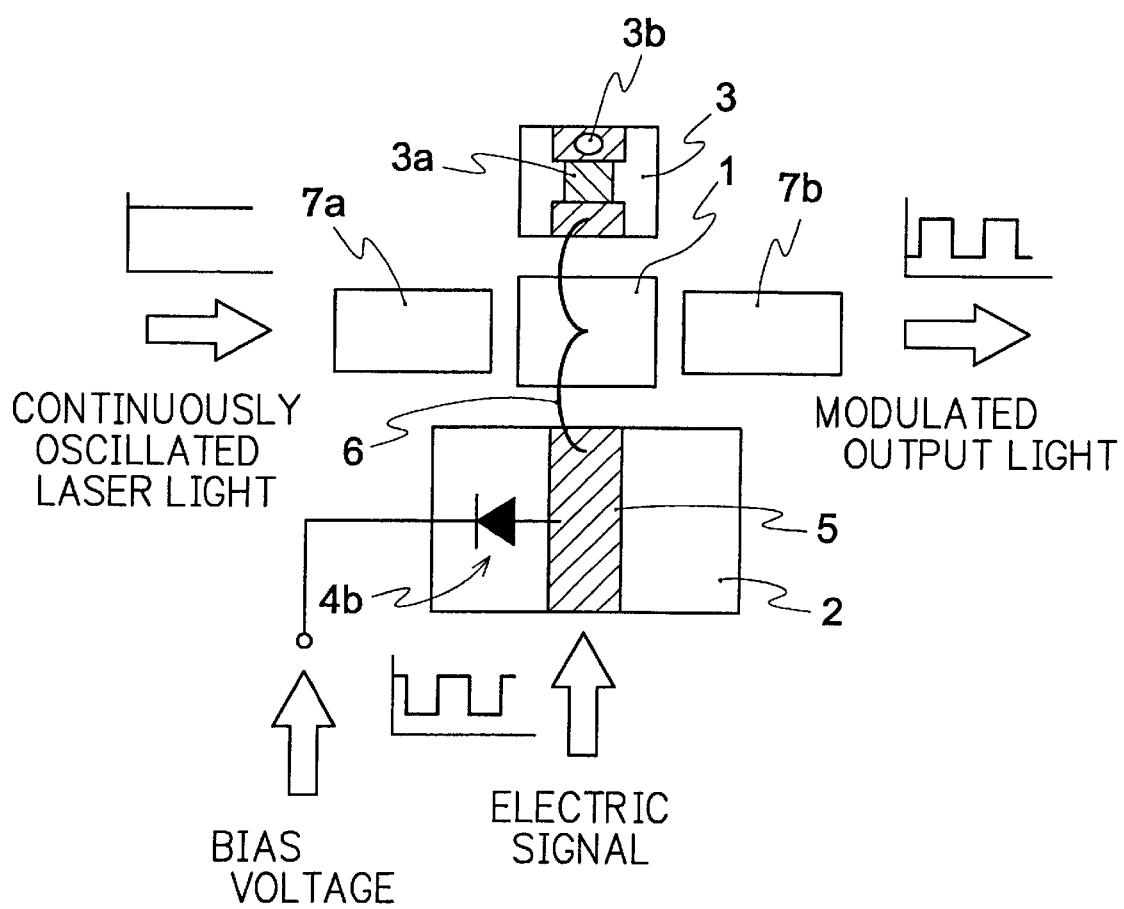
FIG. 6 is a conceptual diagram of an optical modulator according to the third embodiment of the present invention.
Figure 7:
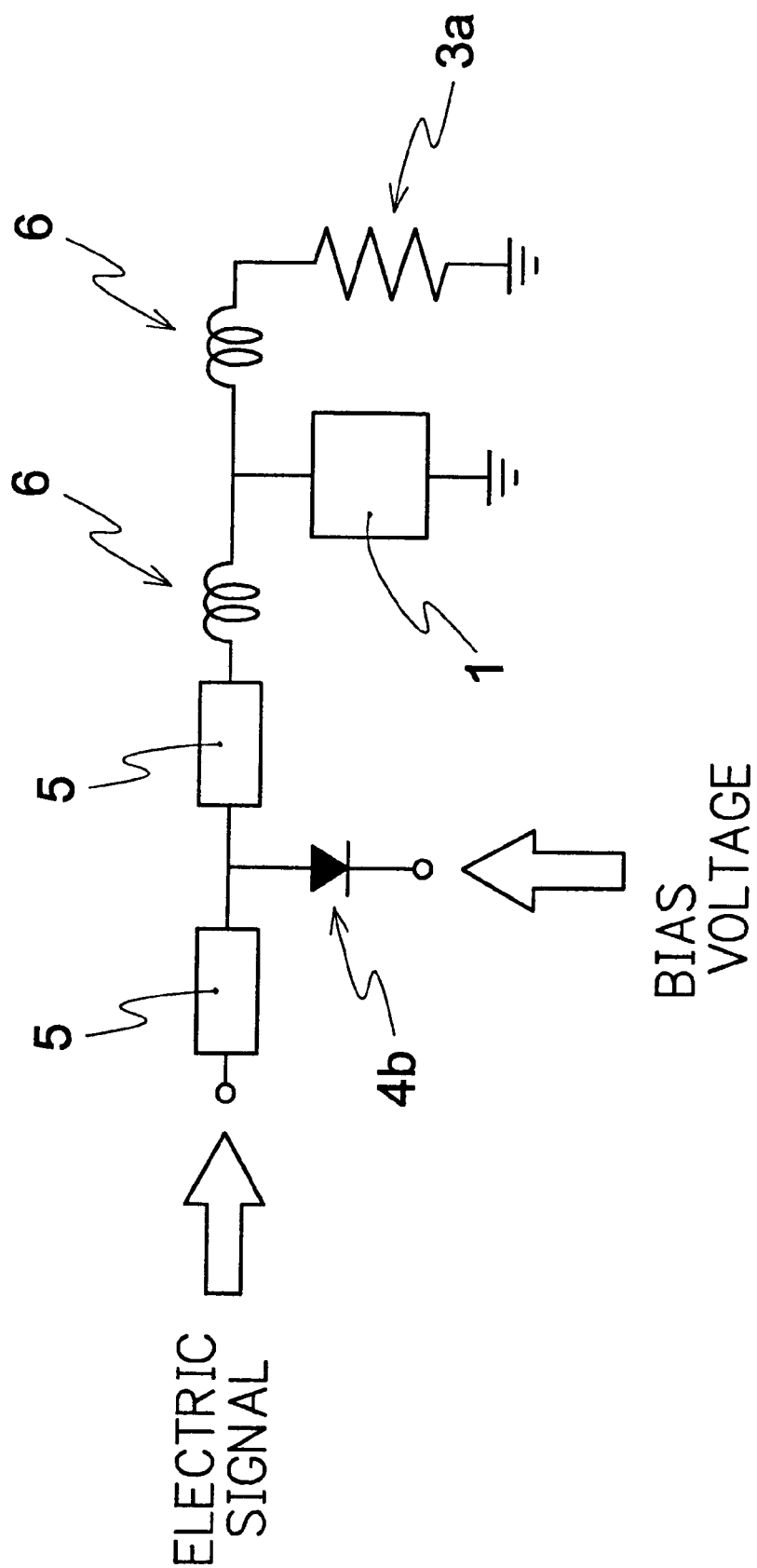
FIG. 7 is a schematic circuit diagram of the optical modulator according to the third embodiment of the present invention.

FIG. 6 is a conceptual diagram of an optical modulator showing Embodiment 3 of the present invention. FIG. 7 is a schematic circuit diagram of the optical modulator of this embodiment. In FIGS. 6 and 7, like components are denoted by identical numerals as those shown in FIG. 1. A high-frequency circuit substrate 2 in the optical modulator of this embodiment has a diode 4b mounted thereon as connected in parallel with a transmission line 5. One terminal of the diode 4b is connected to the transmission line and a bias voltage is applied to another terminal.

Figure 8B:
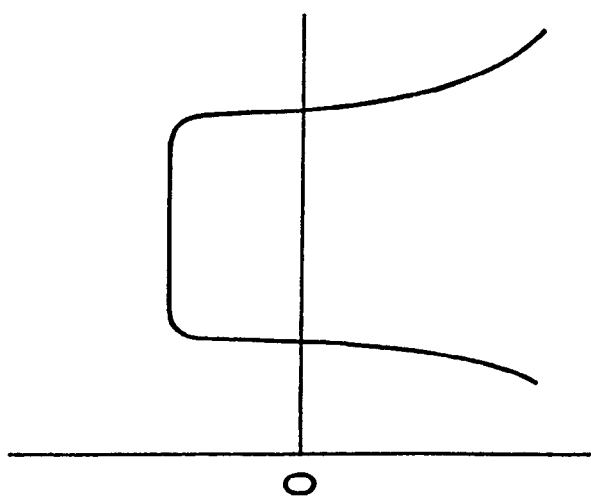
FIG. 8(b) illustrates a waveform of the electric signal applied to the light modulating semiconductor element in the third embodiment of present invention.
Figure 8A:
FIG. 8(a) illustrates a waveform of applied electric signal.
Figure 8A:
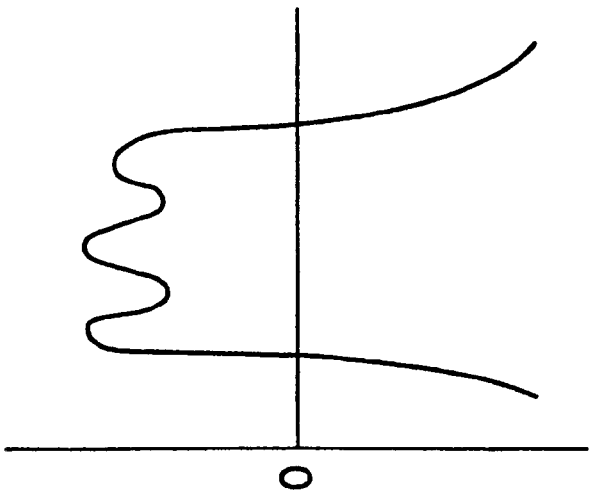

The voltage-current characteristic of the diode 4b teaches that when the diode 4b is loaded at both ends with a reverse voltage or a forward voltage smaller than Vf, the diode 4b draws no current. Accordingly, when the bias voltage applied to the diode 4b is properly determined, a change in the voltage (ringing or pattern effect) at the mark side of the electric signal waveform applied to the light modulating semiconductor element 1 can favorably be suppressed as shown in FIG. 8. FIG. 8(a) illustrates the waveform of an electric signal introduced to the high-frequency circuit substrate 2 while FIG. 8(b) shows the waveform of the electric signal which has desirably been shaped by the diode 4b and is applied to the light modulating semiconductor element 1.

This allows the optical modulator to produce an improved waveform of modulated output light while the extinction characteristic of its electroabsorption type light modulating semiconductor element 1 is not linear. As a result, the eye mask standard or the eye aperture used for expressing the quality of the waveform of modulated output light can successfully be satisfied by the optical modulator of this embodiment.

In Embodiment 2, since the voltage of electric signal at the mark side is fixed to 0 V by the diode 4a, the power of the laser light released from the optical modulator is also fixed at the mark side and even on average and can not be adapted to various requests.

On the other hand, this embodiment makes it possible to adapt the mark side voltage of electric signal applied to the light modulating semiconductor element 1 by applying a suitable bias voltage to the diode 4a. Accordingly, the laser light of well-shaped waveform and desired power can be obtained.

More specifically, the voltage at the mark side of the electric signal waveform released through the diode 4b can be set to a desired level by controlling the voltage of the electric signal and the bias voltage applied to the diode 4b. Accordingly, the output of modulated laser light at the mark side of the waveform and its average level released from the optical modulator can be controlled to a desired level, hence increasing the versatility of the optical modulator.

The diode 4b connected to the transmission line 5 may be inverted in the polarity for diminishing the voltage change (ringing or pattern effect) at the space side.

Embodiment 4

Figure 9:
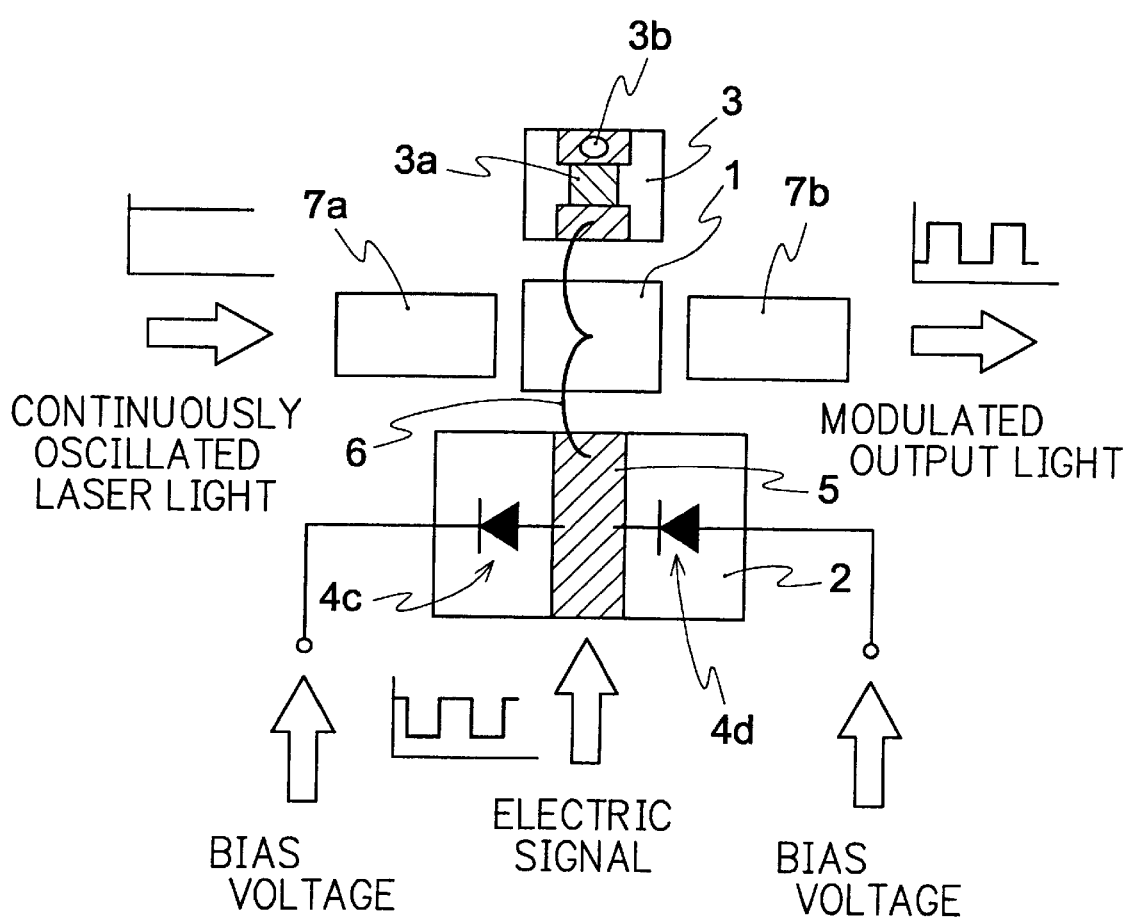
FIG. 9 is a conceptual diagram of an optical modulator according to the fourth embodiment of the present invention.
Figure 10:
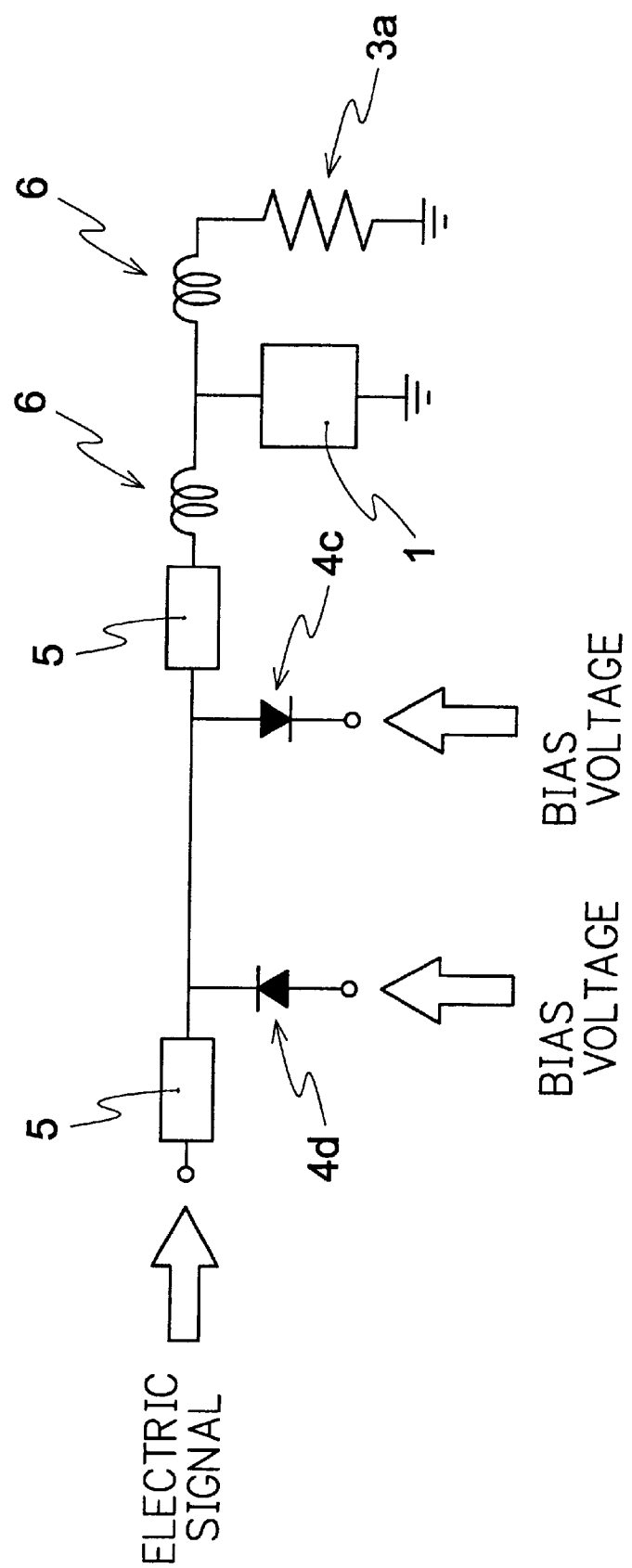
FIG. 10 is a schematic circuit diagram of the optical modulator according to the forth embodiment of the present invention.

FIG. 9 is a conceptual diagram of an optical modulator showing Embodiment 4 of the present invention. FIG. 10 is a schematic circuit diagram of the optical modulator of this embodiment. In FIGS. 9 and 10, like components are denoted by identical numerals as those shown in FIG. 1. The optical modulator of this embodiment has a couple of diodes 4c and 4d connected in parallel with a transmission line 5. Each of the diodes 4c and 4d is loaded with a bias voltage. The two diodes 4c and 4d are connected so that their polarities are reverse to each other.

Figure 11B:
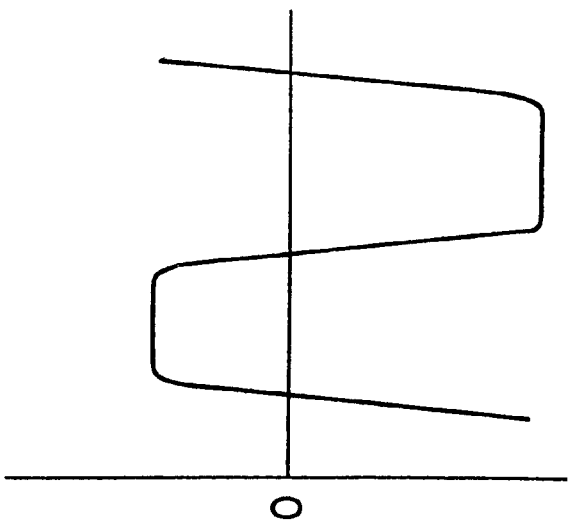
FIG. 11(b) illustrates a waveform of the electric signal applied to the light modulating semiconductor element in the fourth embodiment of present invention.
Figure 11A:
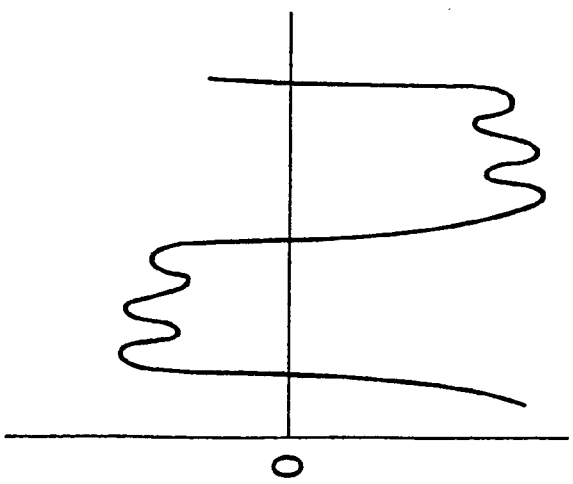
FIG. 11(a) illustrates a waveform of an applied electric signal.

The voltage-current characteristic of the diodes 4c and 4d teaches that when the diodes 4c and 4d are loaded at both ends with a reverse voltage or a forward voltage smaller than Vf, the diodes 4c and 4d draw no current. Accordingly, when the bias voltages applied to the diodes 4c and 4d and the bias voltage of the electric signal are properly controlled to determine desired potential differences between two terminals of each diode 4c and 4d, a change in the voltage (ringing or pattern effect) at both the mark and space sides of the electric signal waveform applied to the light modulating semiconductor element 1 can favorably be suppressed as shown in FIG. 11. FIG. 11(a) illustrates the waveform of an electric signal introduced to the high-frequency circuit substrate 2 while FIG. 11(b) shows the waveform of the electric signal which has desirably been shaped by the two diodes 4c and 4d and is applied to the light modulating semiconductor element 1.

This allows the optical modulator to produce an improved waveform of modulated output light while the extinction characteristic of the light modulating semiconductor element 1 is not linear. As a result, the eye mask standard and the eye aperture used for expressing the quality of the waveform of modulated output light can successfully be satisfied by the optical modulator of this embodiment.

While the circuitry arrangement of Embodiment 3 can attenuate a change in the voltage (e.g. ringing and pattern effect) at either the mark or space side of the waveform of the applied electric signal, this embodiment enables to correct a change in the voltage at both the mark and space sides of the waveform. Thus, the modulator of this embodiment can produce a highly improved waveform of modulated output light.

Embodiment 5

Figure 12:
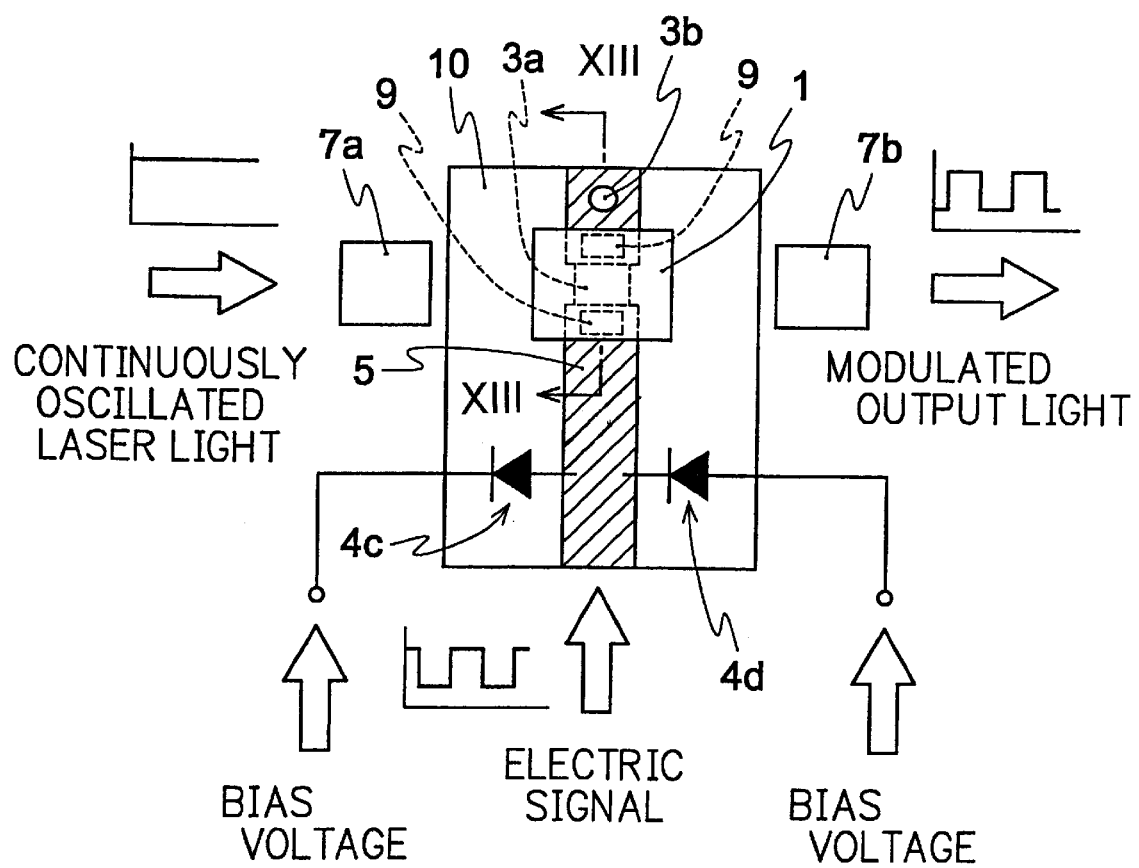
FIG. 12 is a conceptual diagram of an optical modulator according to the fifth embodiment of the present invention.
Figure 13:
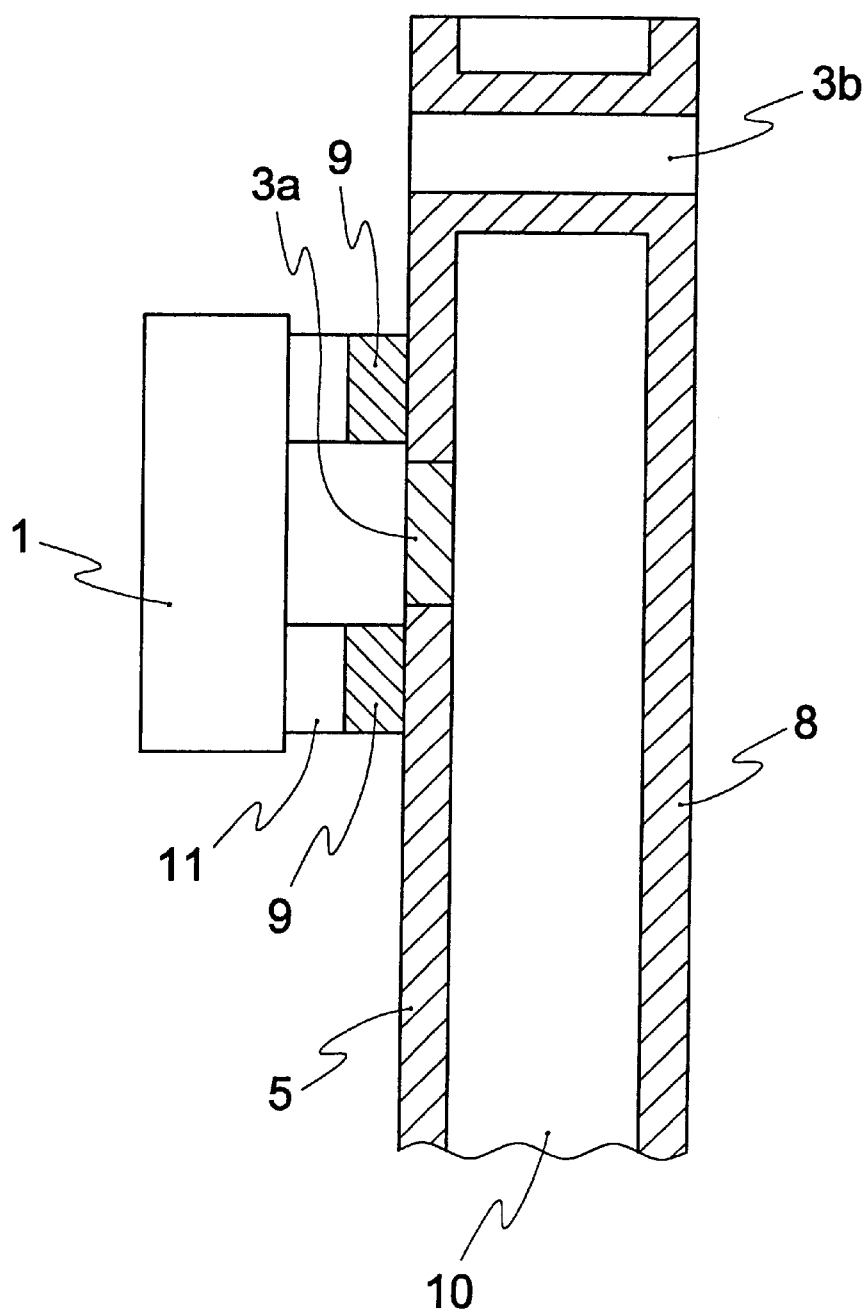
FIG. 13 is a sectional view taken on line XIII—XIII of FIG. 12.

FIG. 12 is a conceptual diagram of an optical modulator showing Embodiment 5 of the present invention. FIG. 13 is a sectional view taken on line XIII—XIII of FIG. 12. In FIGS. 12 and 13, like components are denoted by identical numerals as those shown in FIG. 1. Reference numeral 11 designates an electrode of an electroabsorption type light modulating semiconductor element 1. The optical modulator of this embodiment has an light modulating semiconductor element 1 mounted in flip-chip bonding on a high-frequency circuit substrate or a terminating resistor substrate thereof. In the embodiment of FIG. 13, the high-frequency circuit substrate and the terminating resistor substrate are arranged integral with each other to form a single unit (a common substrate 10). Also, as shown in FIG. 13, the common substrate 10 has a back side thereof covered with a grounding path 8 which electrically connects with the front side of the common substrate 10 via a through hole 3b.

For example, the high-frequency circuit substrate 2, the light modulating semiconductor element 1, and the terminating resistor substrate 3 in Embodiment 4 are connected by a wire 6 to each other. Using these wires 6 may cause an impedance mismatching between the diode 4 and the semiconductor element 1 and may degrade the waveform of a signal applied to the light modulating semiconductor element 1.

The optical modulator of Embodiment 5 replaces the wire 6 with the flip-chip bonding using bumps 9 of gold or soldering material, hence successfully eliminating such impedance mismatching and can produce a highly improved waveform of modulated output light.

Moreover, as described above, since the high-frequency circuit substrate 2 and the terminating resistor substrate 3 are arranged integral with each other, it becomes possible to minimize the number of components and steps for assembling so as to obtain an inexpensive optical modulator. The high-frequency circuit substrate 2 and the terminating resistor substrate 3 are not limited to the single unit.

Embodiment 6

Figure 14:
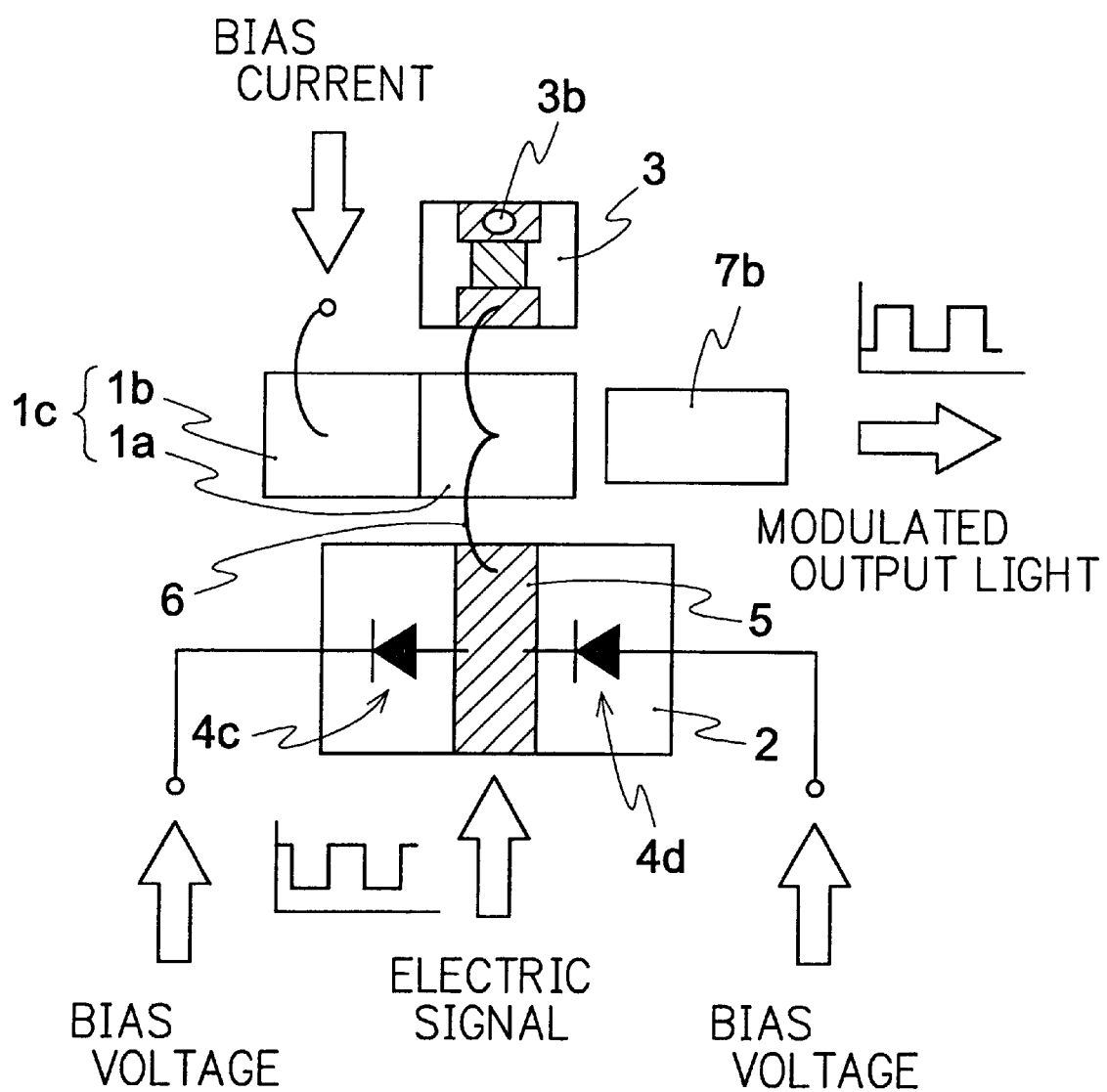
FIG. 14 is a conceptual diagram of an optical modulator according to the sixth embodiment of the present invention.
Figure 15:
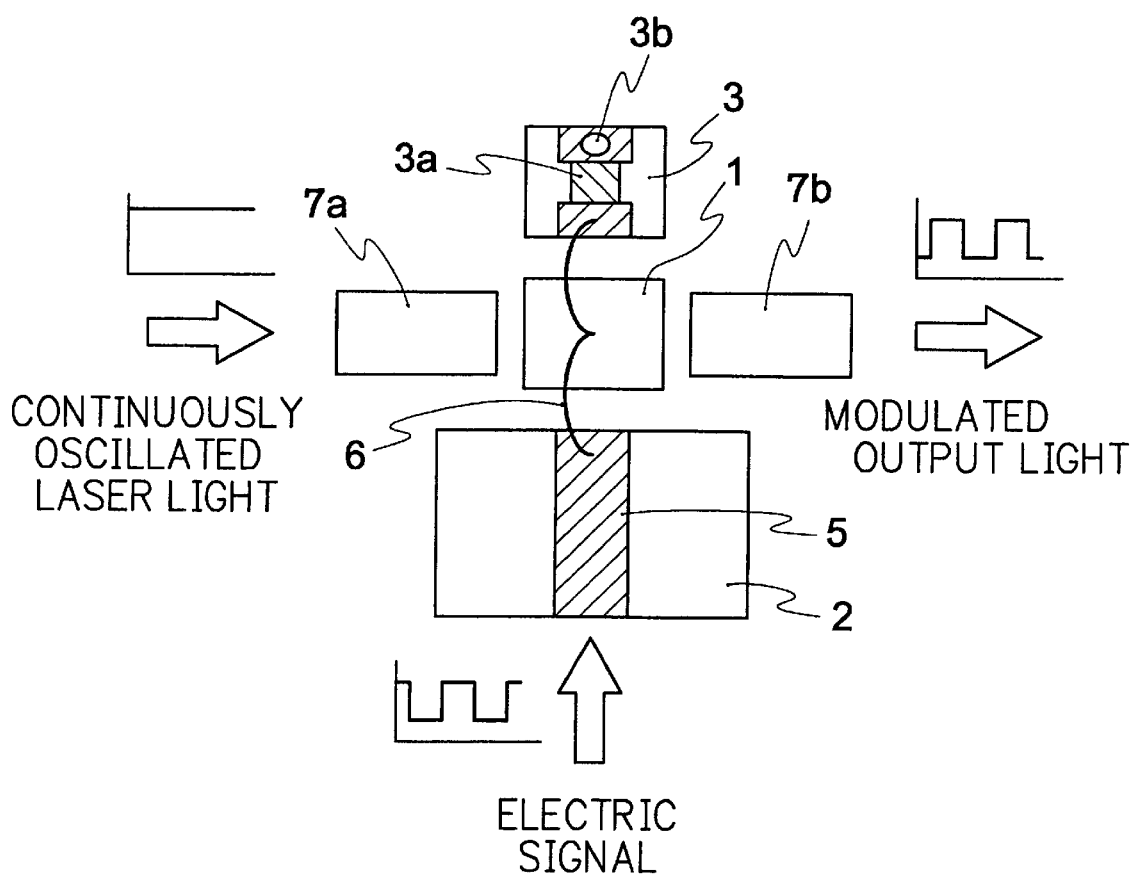
FIG. 15 is a conceptual diagram of a conventional optical modulator.
Figure 16:
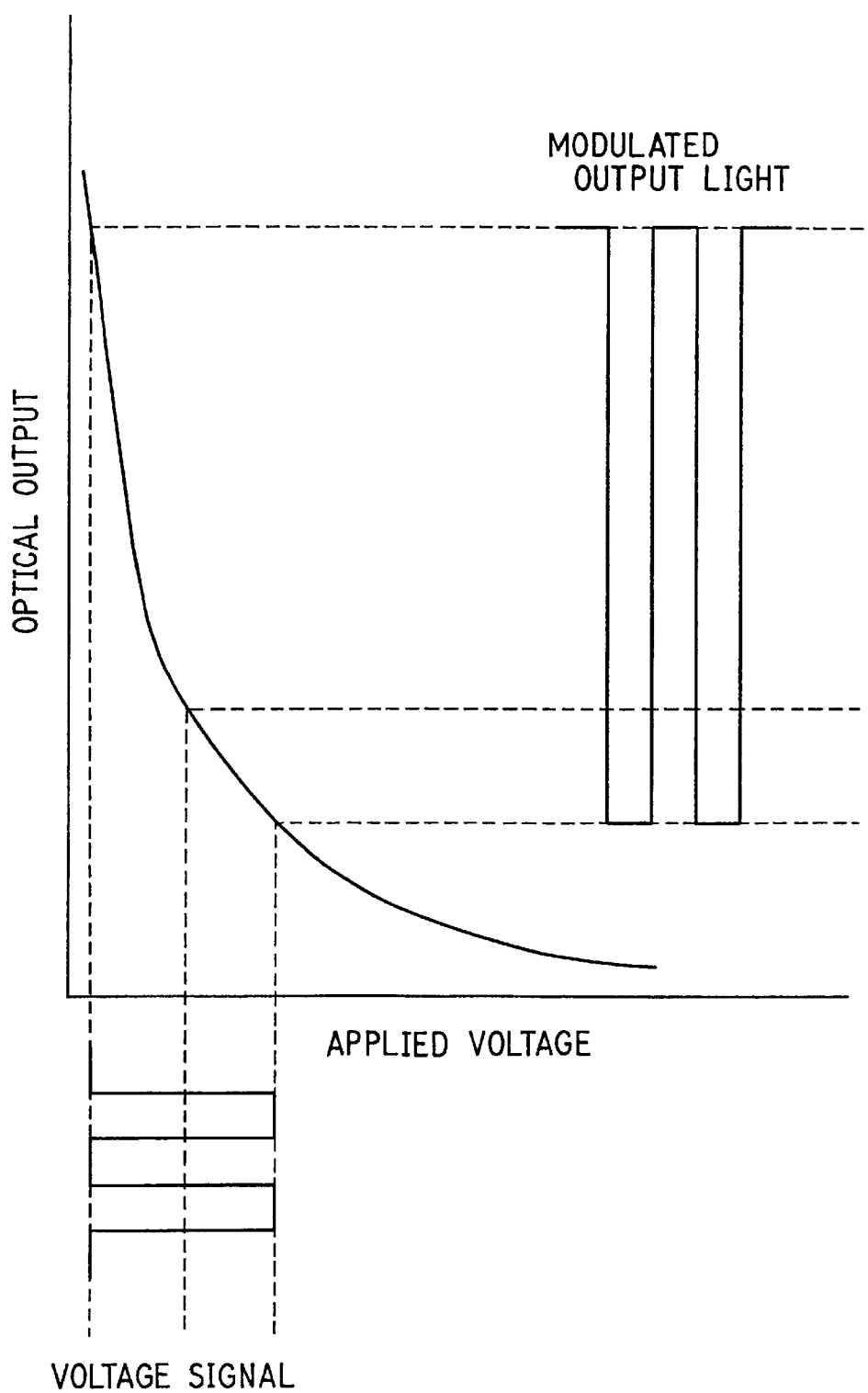
FIG. 16 depicts a extinction characteristic of a light modulating semiconductor element of an electric field absorption type.

FIG. 14 is a conceptual diagram of an optical modulator showing Embodiment 6 of the present invention. In FIG. 14, identical components are denoted by like numerals as those shown in FIG. 1. In this embodiment, the electroabsorption type light modulating semiconductor element of the previous embodiments is replaced by an light modulator integrated semiconductor laser element 1c which consists mainly of an electroabsorption type light modulating semiconductor element 1a and a semiconductor laser emitting device 1b integrated in a monolithic unit.

For example, in Embodiment 4, the optical coupling system 7a is required at the input side for allowing the light modulating semiconductor element 1 to continuously receive a laser beam at higher efficiency as well as a semiconductor laser emitting module is separately needed for continuous oscillation of the laser beam. On the other hand, this embodiment employs the light modulator integrated semiconductor laser element 1c and can successfully reduce the number of components including the input optical coupling system 7a and their assembling steps, thus contributing to the lower cost of the optical modulator. When a optical communication system is developed with a group of the optical modulators of this embodiment, the number of its components can be reduced in total and its overall size and cost can favorably be minimized.

The optical modulator according to the present invention comprises the light modulating semiconductor element having a non-linear extinction characteristic, the high-frequency circuit for supplying the light modulating semiconductor element with a high-frequency electric signal, and the terminating resistor for impedance matching, wherein the high-frequency circuit includes the transmission line for transmitting the high-frequency electric signal and the diode connected to the transmission line. Accordingly, the optical modulator of the present invention can produce a modulated output light of improved waveform while the extinction characteristic of its light modulating semiconductor element is not linear.

In the embodiment wherein the diode is connected in series in the transmission line, the voltage of the applied electric signal at the mark side is suppressed to about 0 V, therefore a change in the voltage (ringing or pattern effect) at the mark side of the electric signal waveform applied to the light modulating semiconductor element can successfully be suppressed.

In the embodiment wherein the diode is connected in parallel with the transmission line, a desired voltage at the mark side of the electric signal applied to the light modulating semiconductor element is available by choosing the bias voltage of the applied electric signal as well as the bias voltage applied to the diode.

In the embodiment wherein the two diodes connected in parallel with the transmission line with their electrical polarities oriented opposite to each other, a change in the voltage at both the mark and space sides of the waveform can successfully be attenuated to have a desired shape.

In the embodiment wherein the light modulating semiconductor element and the high-frequency circuit are located adjacent to each other, the waveform of a modulated output light can highly be improved.

In the embodiment wherein the high-frequency circuit and the terminating resistor are mounted integrally on a single circuit board on which the light modulating semiconductor element is also mounted in a flip-chip bonding, the number of their components and assembling steps can favorably be minimized while the waveform of a modulated output light can highly be improved.

In the embodiment wherein the light modulating semiconductor element and the semiconductor laser emitting device are integrated in a monolithic unit, the optical coupling system at the input side and a laser emitting module can be eliminated, therefore the number of its components and assembling steps can successfully be minimized.

The forgoing is considered as illustrative only of the principles of the invention. Further, because numerous modifications and changes will be readily occur to those skilled in the art, it is not desired to limit the invention to the exact construction and operation shown and described, and accordingly all suitable modifications and equivalents may be resorted to falling within the scope of the invention as defined by the claims which follow.

What is claimed is:

1. An optical modulator comprising:
   a light modulating semiconductor element having a non-linear light extinction characteristic with respect to applied electric signals,
   a high-frequency electric circuit, including a transmission line and a pair of diodes connected in parallel with said transmission line, with the electrical polarities of said diodes oriented opposite to each other, for applying a high-frequency electric signal to the light modulating semiconductor element through said transmission line, and
   a terminating resistor for impedance matching.

2. The optical modulator of claim 1, wherein said light modulating semiconductor element and said high-frequency electric circuit are located adjacent to each other.

3. The optical modulator of claim 1, including a circuit board on which said high-frequency electric circuit and said terminating resistor are mounted integrally, said light modulating semiconductor element being mounted on said circuit board by flip-chip bonding.

4. The optical modulator of claim 1, including a semiconductor laser monolithically integrated with said light modulating semiconductor element.

5. An optical modulator comprising:
   a light modulating semiconductor element having a non-linear light extinction characteristic with respect to applied electric signals, a high-frequency electric circuit, including a transmission line and a diode connected in parallel with said transmission line, for applying a high-frequency electric signal to the light modulating semiconductor element through said transmission line, and a terminating resistor for impedance matching.

6. The optical modulator of claim 5, wherein said light modulating semiconductor element and said high-frequency electric circuit are located adjacent to each other.

7. The optical modulator of claim 5, including a circuit board on which said high-frequency electric circuit and said terminating resistor are mounted integrally, said light modulating semiconductor element being mounted on said circuit board by flip-chip bonding.

8. The optical modulator of claim 5, including a semiconductor laser monolithically integrated with said light modulating semiconductor element.

* * * * *